(12) United States Patent
Tiefenbacher et al.

(10) Patent No.: US 9,481,238 B2
(45) Date of Patent: Nov. 1, 2016

(54) CRASH-TOLERANT SYSTEM ARRANGEMENT IN A MOTOR-VEHICLE ENGINE COMPARTMENT

(71) Applicant: Daimler AG, Stuttgart (DE)

(72) Inventors: Gerd Tiefenbacher, Ostfildern (DE); Roland Huss, Altdorf (DE); Stefan Schaible, Aidlingen (DE); Peter Raitschev, Stuttgart (DE); Johannes Kipp, Empfingen (DE); Georg Georgs, Denkendorf (DE); Gerd Duerr, Neustadt (DE)

(73) Assignee: Daimler AG, Stuttgart (DE)

( * ) Notice: Subject to any disclaimer, the term of this patent is extended or adjusted under 35 U.S.C. 154(b) by 37 days.

(21) Appl. No.: 14/401,161

(22) PCT Filed: May 7, 2013

(86) PCT No.: PCT/EP2013/001351
§ 371 (c)(1),
(2) Date: Nov. 14, 2014

(87) PCT Pub. No.: WO2013/170941
PCT Pub. Date: Nov. 21, 2013

(65) Prior Publication Data
US 2015/0101329 A1    Apr. 16, 2015

(30) Foreign Application Priority Data

May 18, 2012    (DE) .................. 10 2012 009 940

(51) Int. Cl.
*F01N 13/10*    (2010.01)
*B60K 13/04*    (2006.01)
(Continued)

(52) U.S. Cl.
CPC .............. *B60K 13/04* (2013.01); *B62D 21/15* (2013.01); *F01N 13/009* (2014.06);
(Continued)

(58) Field of Classification Search
CPC .............. F01N 13/10; F01N 13/1805; F01N 13/1811; F01N 13/1816; F01N 13/1822; F01N 13/1838; F01N 2340/06
See application file for complete search history.

(56) References Cited

U.S. PATENT DOCUMENTS

| 4,335,078 | A | * | 6/1982 | Ushijima | ............. F01N 3/2853 29/890 |
| 4,559,776 | A | * | 12/1985 | Arai | ......................... F01N 3/28 60/280 |

(Continued)

FOREIGN PATENT DOCUMENTS

| DE | 10 2009 016 941 A1 | 10/2010 |
| EP | 0 679 564 A1 | 11/1995 |

(Continued)

OTHER PUBLICATIONS

Machine translation of FR 2856735 A1, accessed Feb. 22, 2016.*

(Continued)

*Primary Examiner* — Jonathan Matthias
(74) *Attorney, Agent, or Firm* — Crowell & Moring LLP

(57) ABSTRACT

A crash-tolerant system arrangement in an engine compartment situated in the front end region of a motor vehicle includes an exhaust emission control system having an essentially cylindrical first catalytic converter housing situated in front of the exhaust gas turbocharger in the travel direction. The exhaust gas turbocharger is mechanically connected to an exhaust gas manifold via a first fastening device, and to an engine block via a second fastening device, the first and the second fastening devices being designed in such a way that a detachment of the connection of the exhaust gas turbocharger to the exhaust gas manifold and/or a detachment of the connection of the exhaust gas turbocharger to the engine block take(s) place within a predefined upper value range for the pressure force.

17 Claims, 2 Drawing Sheets

Figure 1:
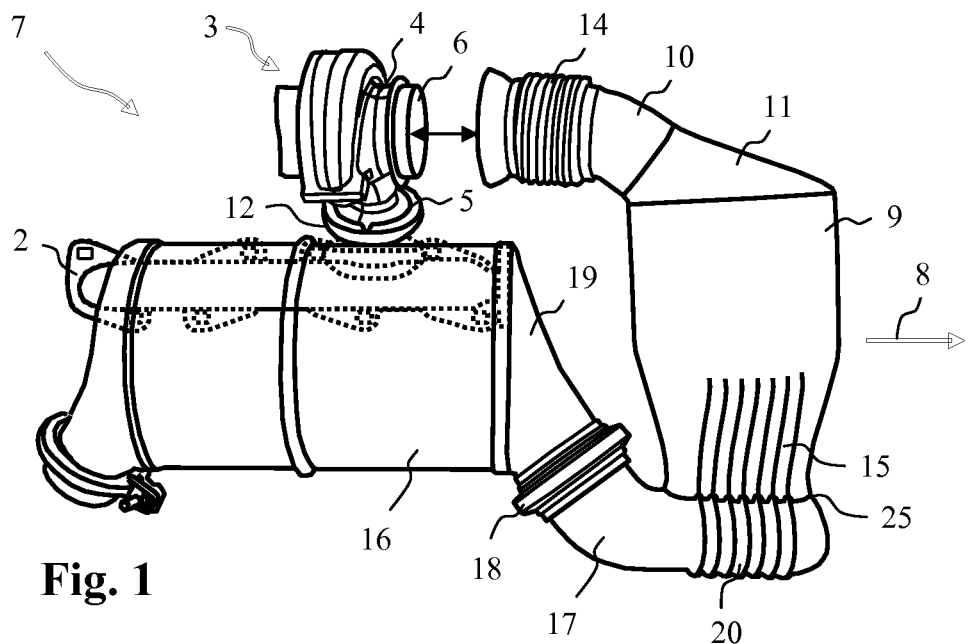

(51) Int. Cl.
 *B62D 21/15* (2006.01)
 *F01N 13/18* (2010.01)
 *F02B 67/10* (2006.01)
 *F01N 13/00* (2010.01)

(52) U.S. Cl.
 CPC ...... *F01N 13/1805* (2013.01); *F01N 13/1811* (2013.01); *F01N 13/1822* (2013.01); *F02B 67/10* (2013.01); *F01N 2340/06* (2013.01); *F01N 2470/18* (2013.01)

(56) References Cited

U.S. PATENT DOCUMENTS

2002/0152748 A1   10/2002  Matsuzawa
2012/0198838 A1*  8/2012  Bruck ................ F01N 13/1805
                                      60/605.1

FOREIGN PATENT DOCUMENTS

| | | | |
|---|---|---|---|
| EP | 1 972 528 A2 | 9/2008 | |
| FR | 2856735 A1 * | 12/2004 | ............. F01D 25/28 |
| FR | 2 909 322 A1 | 6/2008 | |
| JP | 2005-96690 A | 4/2005 | |
| WO | WO 2006/018581 A1 | 2/2006 | |
| WO | WO 2010142647 A1 * | 12/2010 | ......... F01N 13/1805 |
| WO | WO 2012/110720 A1 | 8/2012 | |

OTHER PUBLICATIONS

International Search Report (PCT/ISA/220 and PCT/ISA/210) dated Jun. 25, 2013 with English translation (six pages).
German-language Written Opinion (PCT/ISA/237) dated Jun. 25, 2013 (five pages).
German Search Report dated Nov. 27, 2012 with partial English translation (10 pages).

\* cited by examiner

CRASH-TOLERANT SYSTEM ARRANGEMENT IN A MOTOR-VEHICLE ENGINE COMPARTMENT

BACKGROUND AND SUMMARY OF THE INVENTION

Exemplary embodiments of the invention relate to a crash-tolerant system arrangement in an engine compartment situated in the front end region of a motor vehicle.

In order to increase occupant protection, in particular for the case of a front-end collision, it is known to provide the front end region with energy-absorbing structures that are sufficiently deformable under the action of force. For example, German patent document DE 102009016941 A1 discloses a crash-tolerant system arrangement in an engine compartment situated in the front end region of a motor vehicle, where the system arrangement has energy absorption elements associated with an exhaust gas system of the motor vehicle. However, the requirement for providing the most compact systems possible that can be accommodated in a confined space in an engine compartment despite a high level of complexity makes it difficult to use crash-tolerant energy absorption elements, since these elements usually provide an energy-absorbing deformation path, which entails increased installation space requirements.

Exemplary embodiments of the present invention are directed to a system arrangement in an engine compartment situated in the front end region of a motor vehicle that is both crash-tolerant and compact.

The system arrangement according to the invention comprises an internal combustion engine situated in the engine compartment and having an engine block, an exhaust gas manifold that receives exhaust gases of the internal combustion engine, an exhaust gas turbocharger, associated with the internal combustion engine, having an exhaust gas inlet and an exhaust gas outlet, and an exhaust emission control system having an essentially cylindrical first catalytic converter housing that is situated in front of the exhaust gas turbocharger in the travel direction and in which a first exhaust gas catalytic converter element is situated. Characteristically, a first exhaust gas conducting element for conducting exhaust gas from the exhaust gas outlet of the exhaust gas turbocharger to the first catalytic converter housing is provided, and extends from the exhaust gas outlet of the exhaust gas turbocharger to an inlet funnel of the first catalytic converter housing and is able to transmit a pressure force, which acts on the first catalytic converter housing essentially opposite to the travel direction, at least partially to the exhaust gas turbocharger. The exhaust gas turbocharger is mechanically connected to the exhaust gas manifold via a first fastening device, and to the engine block via a second fastening device, the first and the second fastening devices being designed in such a way that a detachment of the connection of the exhaust gas turbocharger to the exhaust gas manifold and/or a detachment of the connection of the exhaust gas turbocharger to the engine block take(s) place within a predefined upper value range for the pressure force.

Due to this design of the fastenings of the exhaust gas turbocharger to the internal combustion engine, when an impact force which acts, in particular approximately frontally, on the first catalytic converter housing, an energy-absorbing displacement of the first catalytic converter housing that is coupled to the exhaust gas turbocharger is achieved without portions of the exhaust emission control system being pushed into the vehicle interior. This design has proven to be particularly advantageous for an internal combustion engine or engine block, which characteristically has multiple cylinders arranged in succession and which is situated lengthwise in the engine compartment in the travel direction, in particular when a front end of the first catalytic converter housing, viewed in the travel direction, is situated in front of a front end of the engine block. An impact force acting approximately frontally thus initially acts in an energy-absorbing manner on the exhaust emission control system, and action on the engine block, which could move the engine block toward the passenger compartment, is avoided. The design of the fastenings of the exhaust gas turbocharger with a defined strength assures targeted detachment of the turbocharger to which the first catalytic converter housing is fastened via the first exhaust gas conducting element, and thus allows a further force-absorbing displacement of the first catalytic converter housing, thereby avoiding blockage. The dimensioning and the design of the turbocharger fastenings determine the magnitude of the pressure force, acting on them, which causes detachment of the connections to the turbocharger.

The fastening device for connecting the exhaust gas turbocharger to the engine block is preferably designed as a retaining plate that is profiled, and which via a screw connection is fastened on the one hand to the engine block, and on the other hand to the exhaust gas turbocharger housing or to its turbine housing. A detachment of the connection of the exhaust gas turbocharger to the engine block due to a collision-related action of force preferably takes place via a detachment of the screw connection of the mounting to the turbine housing. The fastening device for connecting the exhaust gas turbocharger to the exhaust gas manifold is preferably designed as a detachable line connection, for example in the form of a quick-release coupling. It has proven to be particularly advantageous for the crash characteristic that, after the exhaust gas turbocharger detaches from the internal combustion engine due to the detached connections of the exhaust gas turbocharger, a further energy-absorbing displacement or deformation of portions of the exhaust emission control system and in particular of the first catalytic converter housing is made possible. The fastening devices are preferably designed in such a way that, under an action of force of increasing magnitude, the connection of the exhaust gas turbocharger to the exhaust gas manifold is detached prior to detachment of the connection to the engine block. In order for an impact force that acts approximately frontally to be effectively transmitted from the first catalytic converter housing to the exhaust gas turbocharger via the first exhaust gas conducting element, the exhaust gas turbocharger is preferably situated in such a way that its exhaust gas outlet is oriented toward the front in the travel direction. In addition, the first exhaust gas conducting element preferably extends, at least in part, approximately linearly from the exhaust gas turbocharger outlet to the inlet funnel of the first catalytic converter housing.

In one embodiment of the invention, the first exhaust gas conducting element has a bellows section that undergoes a reduction in length by at least 20 mm within a predefined lower value range for the pressure force, the values of the lower value range being smaller than the values of the upper value range. The bellows section thus has a comparatively soft design. In this way, energy-absorbing deformation is advantageously made possible before a further increase in the action of force results in destruction or detachment of the provided connections of the exhaust gas turbocharger. In addition to force absorption in the event of a collision, during normal operation the bellows section also advantageously brings about decoupling or damping of vibrations emanating from the engine block. The bellows section may also be designed for reductions in length of greater than 20 mm. Maximum length reduction distances of up to 40 mm are considered advantageous.

In another embodiment of the invention, the first and second fastening devices are designed in such a way that a detachment of the connection of the exhaust gas turbocharger to the exhaust gas manifold and/or of the connection of the exhaust gas turbocharger to the engine block takes place under a pressure force of less than 40 kN. The upper limit of the upper value range for the pressure force acting on the first catalytic converter housing is thus 40 kN. However, a detachment of the connections may be provided for lower values down to approximately 20 kN. An appropriate design may be provided, for example, by a connection, screwed down with an appropriate tightening force, of the turbine housing in a yoke hole receptacle of the retaining plate, in which the screw is pushed out of the yoke hole under the action of the pressure force. With regard to a detachment of the connection to the exhaust gas manifold caused under a defined action of force, for the case of a quick-release coupling, for example, a predefined strength of the quick-release bracket may be provided. It has been found by the present inventors that such a design allows particularly efficient utilization of deformation energy.

In another embodiment of the invention, an upper limit of the lower value range for the pressure force is 30 kN. A maximum reduction in length of the bellows section is thus achieved at the latest when the pressure force is 30 kN. This design ensures that damage remains limited in the event of a minor collision.

In another embodiment of the invention, the first catalytic converter housing is situated at least approximately vertically in the engine compartment. Use is thus advantageously made of the fact that the housing has less rigidity or strength in the radial direction than in the axial direction. An impact force acting approximately frontally on the first catalytic converter housing may thus be absorbed in an improved manner. In addition, the vertical arrangement of the first catalytic converter housing allows a particularly compact design of the exhaust emission control system.

In another embodiment of the invention, the first catalytic converter housing has a ribbed structure, at least in part. As a result of this design, the first catalytic converter housing has reduced rigidity in the direction of the action of force, and allows energy-absorbing deformations in an improved manner.

In another embodiment of the invention, the exhaust emission control system has a cylindrical second catalytic converter housing in which a second exhaust gas catalytic converter element and/or a particle filter element is/are situated, a second exhaust gas conducting element for conducting exhaust gas from the outlet side of the first catalytic converter housing to the inlet side of the second catalytic converter housing being provided which at a separation point is detachably connected to an inlet funnel of the second catalytic converter housing. As the result of providing a further exhaust emission control element having filtering and/or catalytic activity, the efficiency of the exhaust aftertreatment system is improved or expanded, and due to the detachable connection, provided with a separation point, of the second catalytic converter housing to the first catalytic converter housing, further latitude in the displacement or deformation is made possible when this connection is detached, which likewise has an energy-absorbing effect and increases the collision tolerance. This effect may be further enhanced when, in another embodiment of the invention, the second exhaust gas conducting element has a ribbed design, at least in part, or has a bellows section.

In another embodiment of the invention, a structural modification acting as a predetermined bending point is provided in a transition area from the second exhaust gas conducting element to the second catalytic converter housing. The predetermined bending point enables a targeted directed bending, thus avoiding a blockage-forming orientation of the first and second catalytic converter housings, in the sense of increasing the strength under the action of a force acting opposite to the travel direction. The predetermined bending point is preferably provided close to a transition between the second exhaust gas conducting element and an inlet funnel of the second catalytic converter housing, and may be achieved by means of an indentation, for example.

In another embodiment of the invention, the second catalytic converter housing is situated at least approximately horizontally in the engine compartment and geodetically underneath the exhaust gas turbocharger, and viewed in the travel direction, behind the first catalytic converter housing and with little or negligible lateral offset with respect to the first catalytic converter housing, in such a way that the top side of the second catalytic converter housing is in the range of the geodetic height of the first catalytic converter housing. The first and second catalytic converter housings are thus situated on the same side of the engine block. In conjunction with the vertical arrangement of the first catalytic converter housing, the horizontal arrangement of the second catalytic converter housing underneath the exhaust gas turbocharger results in a particularly compact design of the exhaust emission control system. Due to this arrangement, the routing of exhaust gas exiting from the first catalytic converter housing undergoes a deflection by at least approximately 90 degrees prior to entering the second catalytic converter housing. This facilitates energy-consuming bending of the second exhaust gas conducting element under the action of an impact force directed opposite to the travel direction.

In another embodiment of the invention, the second catalytic converter housing is connected to the engine block in a force-fit and/or form-fit manner on the exhaust gas inlet side via a first mounting, and on the exhaust gas outlet side via a second mounting, the first mounting having a lower flexural strength than the second mounting, viewed in the travel direction. The first mounting thus allows an energy-absorbing movement, in particular opposite to the travel direction, of components connected to the first mounting. The more rigid design of the second mounting crucially hinders the second catalytic converter housing, which is comparatively rigid in the longitudinal direction, from penetrating into the passenger compartment under the action of a frontal collision force.

In another embodiment of the invention, a flat material component whose surface normal is oriented at least approximately perpendicularly with respect to the travel direction is provided in the area between the first catalytic converter housing and the second catalytic converter housing. This allows the first catalytic converter housing and the first exhaust gas catalytic converter element situated therein to be destroyed by the flat material when the action of the pressure force causes the first catalytic converter housing to be pushed onto the second catalytic converter housing. As a result of the destruction, the rigidity of the first catalytic converter housing is drastically reduced, thus avoiding blockage formation and allowing further energy-absorbing deformation. For particularly effective functioning of the flat material in the sense mentioned, it is advantageous for the surface normal of the flat material to be oriented vertically or approximately vertically. The flat material is advantageously fastened to the second catalytic converter housing, and, for example, may be an integral part of a mounting.

In another embodiment of the invention, a retaining part for the first and/or the second catalytic converter housing is provided in the area between the first catalytic converter housing and the second catalytic converter housing, the retaining part having a geodetically inclined, upwardly directed sliding surface with respect to the travel direction, which allows the first catalytic converter housing to be pushed onto the second catalytic converter housing. A blockage formation of the first and second catalytic converters housing when acted on by an appropriately large impact force is thus avoided, since a further escape path is provided to the first catalytic converter housing.

In another embodiment of the invention, the first catalytic converter housing and/or the second catalytic converter housing is/are made, at least partially, preferably predominantly, of a metal material having a material thickness of less than 1 mm. The design of the housing material as a thin metal sheet reduces the rigidity of the housing, thus allowing deformation with corresponding energy absorption in a particularly effective manner.

In another embodiment of the invention, the first catalytic converter housing is connected to the second exhaust gas conducting element via a weld seam, the weld seam having a predetermined breaking point which allows the weld seam to rupture when a tensile force of a predefined magnitude acts on the predetermined breaking point. As a result, when acted on by an impact force of a certain magnitude, the first catalytic converter housing detaches from the second exhaust gas conducting element. Further displacement of the first catalytic converter housing is thus enabled, for the most part independently of its connection to the second catalytic converter housing, and a blockage formation which has a rigidifying effect is likewise avoidable.

BRIEF DESCRIPTION OF THE DRAWING FIGURES

Figure 2:
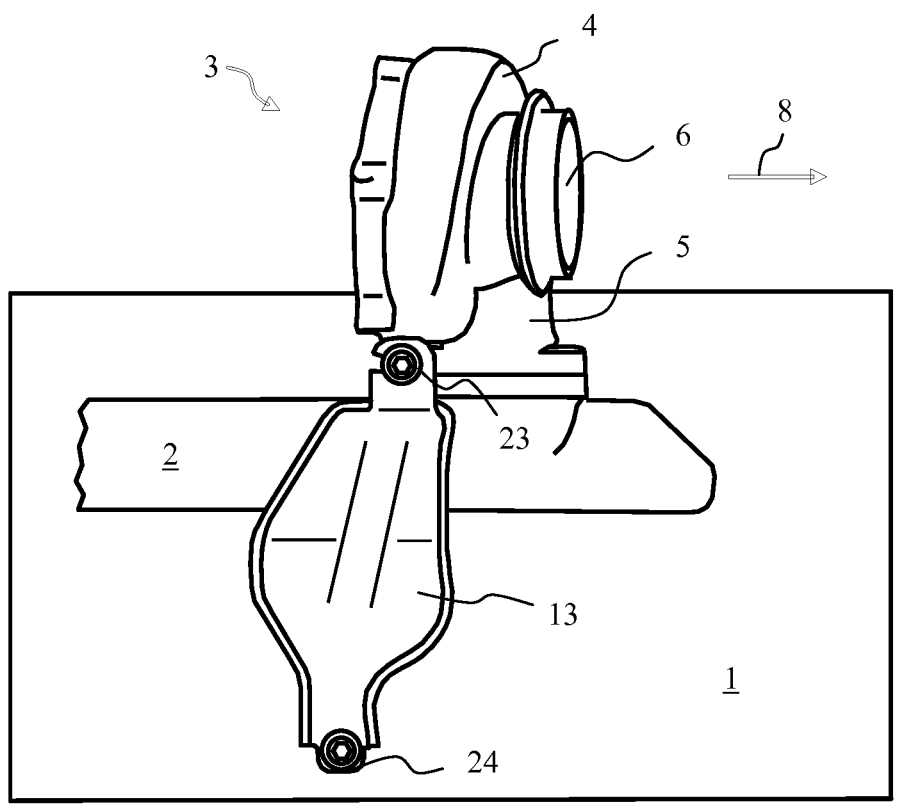
Figure 3:
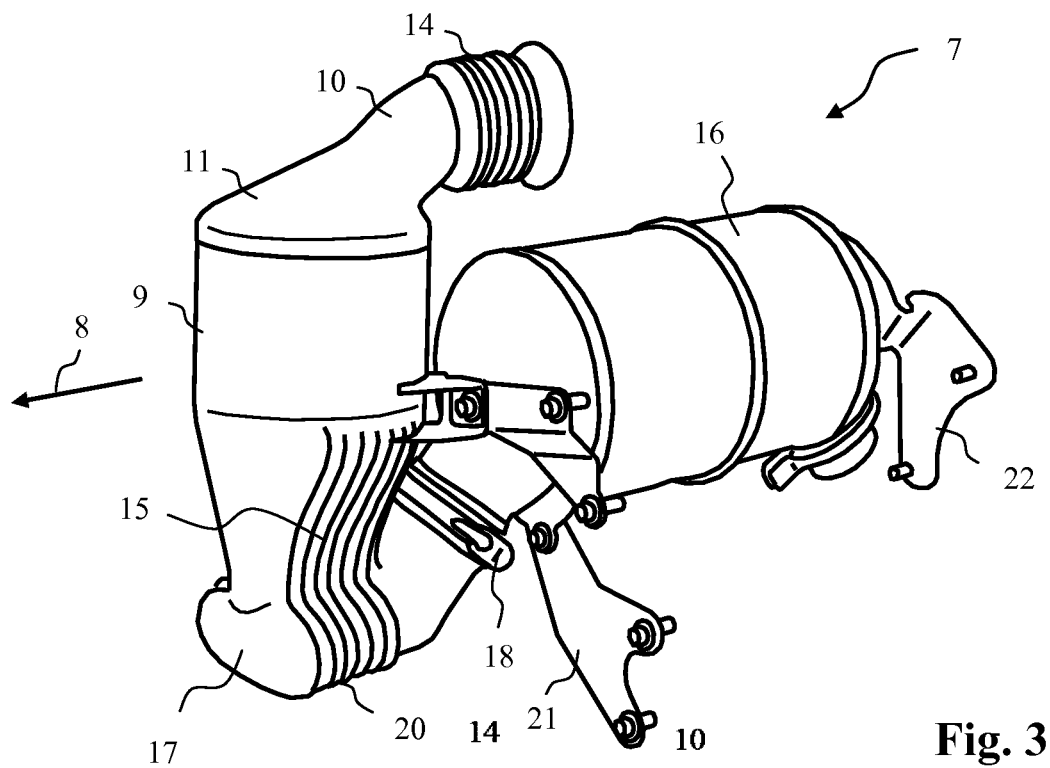
Figure 4:
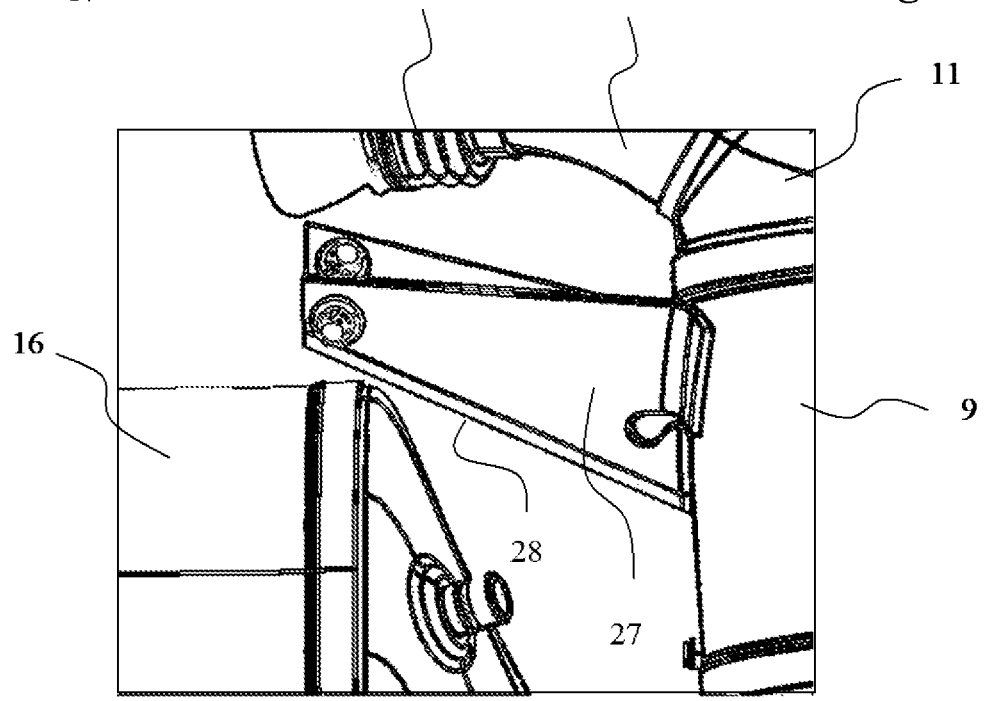

Further advantages, features, and particulars of the invention result from the following description of preferred exemplary embodiments and with reference to the drawings. The features and feature combinations mentioned above in the description as well as the features and feature combinations mentioned below in the description of the figures and/or only shown in the figures may be used not only in the particular stated combination, but also in other combinations or alone without departing from the scope of the invention. The figures show the following:

FIG. 1 shows a schematic illustration of one advantageous design of the system arrangement according to the invention, in a partial view transverse to the travel direction, FIG. 2 shows a schematic illustration of fasteners of the turbocharger in the system arrangement according to FIG. 1, FIG. 3 shows a schematic illustration of the system arrangement according to FIG. 1, in a partial view at an angle to the travel direction, and FIG. 4 shows a detailed view of the system arrangement according to the invention according to FIG. 1.

DETAILED DESCRIPTION

FIG. 1 shows a schematic view of an exhaust emission control system 7, an exhaust gas turbocharger 3, and an exhaust gas manifold 2 as essential components of the crash-tolerant system arrangement according to the invention in one advantageous design or configuration.

The exhaust emission control system 7, situated in an engine compartment in a front end region of a motor vehicle, has a first catalytic converter housing 9 and a second catalytic converter housing 16. In the present case, the catalytic converter housings 9, 16 have a circular cylindrical shape. The first catalytic converter housing 9 is upright, i.e., at least approximately vertical, and with respect to the travel direction denoted by an arrow 8 is situated at least approximately in alignment in front of the prone, i.e., at least approximately horizontal, second catalytic converter housing 16. A clearance space is provided between the first catalytic converter housing 9 and the second catalytic converter housing 16, viewed in the travel direction 8; in the event of an impact force acting on the first catalytic converter housing 9 opposite to the travel direction 8, the clearance space allows latitude for a force-consuming pushing away of the first catalytic converter housing 9 opposite to the travel direction 8. An exhaust gas catalytic converter element situated in the first catalytic converter housing 9 is preferably designed as an oxidation catalytic converter. A particle filter is preferably situated in the second catalytic converter housing 16, upstream from an SCR catalytic converter, viewed in the travel direction 8, the particle filter preferably being provided with an SCR catalyst coating. This embodiment allows comprehensive exhaust emission control and a compact, space-saving design of the exhaust emission control system 7.

The first catalytic converter housing 9 receives exhaust gas from a diesel engine (not illustrated), which in the present case has a four-cylinder design, via a first exhaust gas conducting element 10 which opens into an inlet funnel 11 of the first catalytic converter housing 9. In the present case, the first exhaust gas conducting element 10 is essentially horizontal and oriented in the travel direction 8, while the inlet funnel 11 causes a deflection of the exhaust gas flow direction by approximately 90 degrees. A front wall area of the first catalytic converter housing 9, viewed in the travel direction 8, is situated at a distance in front of a front end of the diesel engine, as the result of which an approximately frontal impact force initially acts on the first catalytic converter housing 9. Exhaust gas treated by an oxidation catalytic converter is conducted from the first catalytic converter housing 9 to the second catalytic converter housing 16 via a second exhaust gas conducting element 17. The second exhaust gas conducting element 17 is connected to an inlet funnel 19 of the second catalytic converter housing 16 via a detachable separation point 18, which in the present case is designed as a quick-release coupling. Upstream from a deflection of the exhaust gas from an essentially vertical direction into an essentially horizontal direction, an injector for aqueous urea solution as a reducing agent for the selective catalytic reduction of nitrogen oxides is provided in a tapering outlet section of the first catalytic converter housing 9, the injector spraying the urea solution onto the mixer plates and evaporator plates (not separately illustrated) situated in the interior of the outlet section. The second exhaust gas conducting element 20 functions as a mixing and hydrolysis section for the delivered urea solution.

On the inlet side, the first catalytic converter housing 9 is connected via the first exhaust gas conducting element 10 to an exhaust gas outlet 6, which is open viewed in the travel direction 8, of a turbine housing 4 of the exhaust gas turbocharger 3. An exhaust gas inlet 5 of the turbocharger 3 or the turbine housing 4 communicates with the exhaust gas manifold 2 of the diesel engine, and receives exhaust gases discharged from the diesel engine. A detachable separation point 12, in the present case designed as a quick-release coupling, is provided for the inlet-side connection of the turbine housing 4 to the exhaust gas manifold 2. The exhaust gas turbocharger 3, as illustrated, is situated geodetically above the second catalytic converter housing 16 and also above the exhaust gas manifold 2, thus allowing a narrow, compact design. In addition to the mechanical connection to the exhaust gas manifold 2 via the separation point 12, a further mechanical fastening of the exhaust gas turbocharger 3 or the turbine housing 4 is provided, as explained in greater detail below with reference to FIG. 2.

FIG. 2 illustrates a fastening of the exhaust gas turbocharger 3 or the turbine housing 4 to an engine block 1 of the diesel engine, which is only roughly depicted in a schematic manner. The fastening is achieved by a fastening device 13, which in the present case includes a profiled retaining plate that is rigid in the travel direction 8, via which the turbine housing 4 is mechanically connected to the engine block 1. For this purpose, the fastening device 13 has a connection point 23, in the present case designed as a screw connection, via which the retaining plate is fastened to the turbine housing 4. The retaining plate is fastened to the engine block 1 via a second connection point 24, which likewise is designed as a screw connection.

The exhaust emission control system 7 is likewise fastened to the engine block 1, as illustrated in FIG. 3. The exhaust emission control system 7, illustrated transverse to the travel direction 8 in FIG. 1, is shown in FIG. 3 in an oblique view from the front with respect to the travel direction 8. A first mounting 21 and a second mounting 22 are apparent. The second catalytic converter housing 16 is fastened to the engine block 1 on the exhaust gas inlet side by means of the first mounting 21. The second catalytic converter housing 16 is fastened to the engine block 1 on the exhaust gas outlet side by means of the second mounting 23.

The system arrangement according to the invention has a particularly crash-tolerant design due to various structural measures described below with reference to FIGS. 1 through 4, in the sense that an impact force which acts in particular approximately frontally, i.e., opposite to the travel direction 8, may be effectively absorbed, and penetration of components, in particular of the exhaust emission control system 7, into the passenger compartment may be completely or largely prevented, at least in most cases.

In the event of an essentially frontal collision of appropriate severity with an obstruction, such as a rigid barrier, for example, components situated in front of the exhaust emission control system 7 in the travel direction 8 are initially pressed in, and the impact force then acts on the first catalytic converter housing 9, whose front boundary in the travel direction 8 is preferably situated in front of the front boundary of the engine block 1. Due to this action of force, the first catalytic converter housing 9 is displaced opposite to the travel direction 8, which is made possible due to the fact that the first exhaust gas conducting element 10 has a bellows section 14 that allows an energy-absorbing deformation. In addition, a displacement of the first catalytic converter housing 9 is also made possible due to the fact that in the region of the connection of the second exhaust gas conducting element 17 and the second catalytic converter housing 16, a structural modification is provided which allows bending of the second exhaust gas conducting element 17. The structural modification may be provided, for example, as an indentation directly upstream from the separation point 18 in the second exhaust gas conducting element 17 and/or directly downstream from the second separation point 18 in the transition to the inlet funnel 19 of the second catalytic converter housing 16. A structural modification or predetermined bending point may be provided that facilitates upward or also downward bending. In addition, the second separation point 18 may be designed in such a way that it detaches under an action of force of predefined magnitude. Downward bending of the second exhaust gas conducting element 17 while providing a deformation path is also facilitated due to the fact that the inlet funnel 19 of the second catalytic converter housing 16 is oriented downwardly at an angle, and therefore has reduced rigidity under a force which acts opposite to the travel direction 8. In this way, the distance between the first catalytic converter housing 9 and the second catalytic converter housing 16 may be shortened during energy absorption, and a deformation path is provided.

Displacement of the entire exhaust emission control system 7 may be enabled by yielding of the first mounting 21, as well as of the second mounting 22. For this purpose, the first mounting advantageously has a less rigid design viewed in the travel direction 8 than in the direction transverse thereto. For the second mounting 22, a structural design and fastening to the engine block 1 are provided in such a way that the second mounting has a much higher rigidity, compared to the first mounting 21, with regard to bending opposite the travel direction 8, at least above a certain magnitude of the force which acts opposite to the travel direction 8. Penetration of the second catalytic converter housing 16 into the passenger compartment is thus prevented or at least hindered, even for comparatively large forces, since after traveling a certain displacement path, the second catalytic converter housing 16 runs against the second mounting 22, which is then resistant to bending, and additional displacement is hindered even further.

For a pressure force or impact force that continues to increase after telescoping of the bellows section 14 of the first exhaust gas conducting element 10, this pressure force or impact force is increasingly transmitted to the exhaust gas turbocharger 3 via the first exhaust gas conducting element 10. To enable a further deformation or displacement path, the mounting of the turbine housing 4 on the first connection point 23 comes loose above a certain action of force of preferably 40 kN maximum opposite to the travel direction 8 on the front side of the first catalytic converter housing 9 or on the turbine housing 4. The first separation point 12 is preferably designed in such a way that it is likewise detached in the event of an action of force present in this area. In particular, it is preferably provided to design the connections of the exhaust gas turbocharger 3 to the exhaust gas manifold 2 and to the engine block 1 in such a way that they may be detached at the latest when the mentioned action of force reaches a magnitude of 40 kN. Thus, in this case the turbocharger 3 is at least approximately completely detached, and cannot, or at least can no longer significantly, hinder further displacement of the first catalytic converter housing 9. The first connection point 23, the first separation point 12, and the bellows section 14 are designed interdependently, so that detachment of the first connection point 23 and of the first separation point 12 does not take place until after the bellows section 14 has undergone a certain reduction in length of preferably at least 20 mm. The bellows section 14 is thus preferably designed in such a way that it allows a reduction in length of at least 20 mm under the action of an axial pressure force of 30 kN or less.

A targeted force-dependent detachment of the first connection point 23 is preferably made possible in that the corresponding screw connection of the fastening device 13 has a yoke hole, which is open opposite to the travel direction, for accommodating the connecting screw. Under the action of the pressure force or impact force of preferably less than 40 kN on the turbine housing 4 opposite to the travel direction 8, the connecting screw may be pushed out of the yoke hole receptacle in the first connection point 23. Displacement of the turbocharger 3 from its retaining position opposite to the travel direction 8 and a further displacement of the first catalytic converter housing 9 that is also mechanically coupled to the turbocharger 3 are thus made possible. It is preferably provided that the connection of the turbine housing 4 to the exhaust gas manifold 2 via the first separation point 12 is already detached before a detachment of the first connection point 23.

Due to the elimination of displacement blockage of the first catalytic converter housing 9 as the result of detachment of the connections of the exhaust gas turbocharger 3, under a further action of force the first catalytic converter housing 9 may be further displaced opposite to the travel direction 8, with energy absorption, and ultimately runs against the second catalytic converter housing 16. Energy absorption occuring during this displacement is partially, preferably predominantly, made possible by the above-mentioned bending of the second exhaust gas conducting element 17 and pressing in of the inlet funnel 19 of the second catalytic converter housing 16.

To allow a further force-consuming displacement path after the first catalytic converter housing 9 runs against the second catalytic converter housing 16, on the one hand it is provided that the first catalytic converter housing 9 has a ribbed structure 15, at least on the outlet side, which simplifies compression opposite to the travel direction 8. The second exhaust gas conducting element 17 preferably also has such a ribbed design, or has a bellows section 20. On the other hand, a ribbed structure may also be provided for the second catalytic converter housing 16 that reduces the rigidity of the second catalytic converter housing in the axial direction and simplifies pressing in the axial direction. In addition, the second separation point 18 may be designed so as to ensure that it comes loose under the action of a predefinable force. In addition, as the result of an arrangement of the first catalytic converter housing 9 and the second catalytic converter housing, the top side of the second catalytic converter housing 16 is situated in the range of the geodetic height of the first catalytic converter housing 9, so that the first catalytic converter housing 9 may be radially pressed in by the second catalytic converter housing 16, in particular by the top side thereof. Pressing in of the first catalytic converter housing 9 is preferably also simplified in that it is made at least partially, preferably predominantly, of a metal material having a material thickness of less than 1 mm. In addition, the second catalytic converter housing 16 may be made completely or partially of such a thin sheet metal material.

Lastly, radial pressing in or even destructive rupture of the first catalytic converter housing 9 after it runs against the second catalytic converter housing 16 may be simplified by providing a flat material component in the area between the first catalytic converter housing 9 and the second catalytic converter housing 16, the surface normal of the flat material component being oriented at least approximately perpendicularly with respect to the travel direction 8. In particular, an approximately horizontally situated flat material may be provided that is preferably fastened to the second catalytic converter housing 16, in particular at the upper region thereof. The action of force opposite to the travel direction 8 simplifies pressing in of the first catalytic converter housing when the first catalytic converter housing 9 strikes the flat side of the flat material. Upon further displacement, destructive rupture of the oxidation catalytic converter situated in the first catalytic converter housing 9 is also made possible, thus greatly reducing the rigidity, avoiding blockage formation, and providing a further force-absorbing displacement or deformation path.

It may also advantageously be provided to allow a yielding displacement of the first catalytic converter housing, in particular in an upwardly angled direction, when the first catalytic converter housing 9 strikes against the second catalytic converter housing 16. For this purpose, it is particularly advantageous for a weld seam 25 that connects the first catalytic converter housing 9 to the second exhaust gas conducting element 17 to be designed in such a way that it ruptures before the first catalytic converter housing 9 strikes against the second catalytic converter housing 16. The overall strength of the weld seam 25 may be appropriately designed for this purpose. Additionally or alternatively, the weld seam 25 may have a predetermined breaking point which allows simplified rupturing of the weld seam 25. A predetermined breaking point created by a material weak point, for example, is preferably provided at an end of the weld seam 25 facing and/or facing away from the second catalytic converter housing 16. If the weld seam ruptures, the first catalytic converter housing is practically detached, and sliding to the second catalytic converter housing 16 is made possible. Such sliding may be facilitated by angled beveling of the second catalytic converter housing 16. However, an appropriately shaped retaining part is preferably provided that is also used for fastening the first and/or second catalytic converter housing 9, 16 and which provides a corresponding sliding surface, as illustrated with reference to FIG. 4.

FIG. 4 shows in particular a detail of the system arrangement according to the invention, in which an area between the first catalytic converter housing 9 and the second catalytic converter housing 16 is illustrated. In the present case, a retaining part 27 is fastened at the upper area of the first catalytic converter housing 9, has an approximately V-shaped design, and bridges the clearance space between the first catalytic converter housing 9 and the second catalytic converter housing 16. The retaining part 27 is oriented with an upwardly angled inclination, and overlaps the top front area of the second catalytic converter housing 16. The retaining part 27 may be flat at its tapered bottom end, thus providing a sliding surface 28 that simplifies sliding of the first catalytic converter housing 9 onto the second catalytic converter housing 16. However, a sharp-edged bottom side may also be provided for the retaining part 27 that causes pressing in or cutting in of the second catalytic converter housing 16 when the first catalytic converter housing 9 is pushed onto the second catalytic converter housing 16, thus reducing the strength of the second catalytic converter housing in the axial direction. Force-consuming pressing in of the second catalytic converter housing 16 in the axial direction is thus made possible, and a further energy-absorbing displacement and deformation path is provided.

Overall, the measures described above provide a system arrangement which is compact and still provides collision protection, which in particular in the event of a front-end collision or a laterally offset and/or angled frontal impact with an obstruction allows particularly good energy absorption, and largely avoids potentially injurious penetration of components into the passenger compartment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A crash-tolerant system arrangement in an engine compartment situated in a front end region of a motor vehicle, comprising:
   an internal combustion engine situated in the engine compartment and having an engine block;
   an exhaust gas manifold arranged so that it receives exhaust gases of the internal combustion engine;
   an exhaust gas turbocharger, coupled to the internal combustion engine, having an exhaust gas inlet and an exhaust gas outlet;
   an exhaust emission control system having a cylindrical first catalytic converter housing that is situated in front of the exhaust gas turbocharger in a travel direction and in which a first exhaust gas catalytic converter element is situated;
   a first exhaust gas conducting element having a bellows section and configured to conduct the exhaust gas from the exhaust gas outlet of the exhaust gas turbocharger to the first catalytic converter housing, the first exhaust gas conducting element extending from the exhaust gas outlet of the exhaust gas turbocharger to an inlet funnel of the first catalytic converter housing so that a pressure force acting on the first catalytic converter housing opposite to the travel direction is at least partially transmitted to the exhaust gas turbocharger;
   a coupling defining a first fastening device by which the exhaust gas turbocharger is mechanically connected to the exhaust gas manifold; and
   a profiled retaining plate and screw connections defining a second fastening device,
   wherein the first and the second fastening devices are configured in such a way that a detachment of the first and second fastening devices occurs within a predefined upper value range for the pressure force acting on the first catalytic converter housing opposite to the travel direction and only after said bellows section undergoes a certain reduction in length.

2. The system of claim 1, wherein the bellows section is configured to undergo a reduction in length by at least 20 mm within a predefined lower value range for the pressure force, the values of the lower value range being smaller than the values of the upper value range.

3. The system of claim 2, wherein an upper limit of the lower value range for the pressure force is 30 kN.

4. The system of claim 1, wherein the first and second fastening devices are configured in such a way that a detachment of the connection of the exhaust gas turbocharger to the exhaust gas manifold or of the connection of the exhaust gas turbocharger to the engine block occurs place under a pressure force of less than 40 kN.

5. The system of claim 1, wherein the first catalytic converter housing is situated at vertically in the engine compartment.

6. The system of claim 1, wherein at least part of the first catalytic converter housing has a ribbed structure.

7. The system of claim 1, wherein the exhaust emission control system has a cylindrical second catalytic converter housing in which a second exhaust gas catalytic converter element or a particle filter element is situated, wherein the second catalytic converter housing is arranged horizontally in the engine compartment and geodetically underneath the exhaust gas turbocharger, and viewed in the travel direction, behind the first catalytic converter housing.

8. The system of claim 7, further comprising:
   a second exhaust gas conducting element configured to conduct exhaust gas from an outlet side of the first catalytic converter housing to an inlet side of the second catalytic converter housing, wherein the second exhaust gas conducting element is detachably connected to an inlet funnel of the second catalytic converter housing at a separation point.

9. The system of claim 8, wherein a top side of the second catalytic converter housing is disposed between a first junction of the first catalytic converter housing with the inlet funnel and a second junction of the first catalytic converter housing with the second exhaust gas conducting element.

10. The system of claim 8, wherein a predetermined bending point is provided in a transition area from the second exhaust gas conducting element to the second catalytic converter housing.

11. The system of claim 7, wherein the second catalytic converter housing is situated on the same side as the first catalytic converter housing with respect to the engine block.

12. The system of claim 7, wherein at least part of the second exhaust gas conducting element has a ribbed design or the second exhaust gas conducting element has a bellows section.

13. The system of claim 7, wherein the second catalytic converter housing is connected to the engine block in a force-fit or form-fit manner on an exhaust gas inlet side via a first mounting, and via a second mounting on an exhaust gas outlet side.

14. The system of claim 13, wherein the first mounting has a lower flexural strength than the second mounting, viewed in the travel direction.

15. The system of claim 7, further comprising:
   a retaining part for the first or the second catalytic converter housing arranged in an area between the first catalytic converter housing and the second catalytic converter housing, the retaining part having a geodetically inclined, upwardly directed sliding surface with respect to the travel direction which allows the first catalytic converter housing to be pushed onto the second catalytic converter housing.

16. The system of claim 7, wherein the first catalytic converter housing or the second catalytic converter housing is made, at least partially, of a metal material having a material thickness of less than 1 mm.

17. The system of claim 1, wherein one of the screw connections mechanically connects the retaining plate to a turbine housing of the exhaust gas turbocharger and the other of the screw connections mechanically connects the retaining plate to the engine block.

* * * * *